United States Patent Office 3,030,677
Patented Apr. 24, 1962

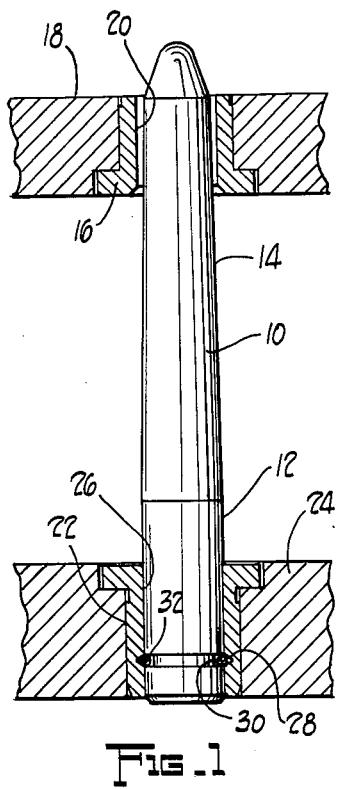
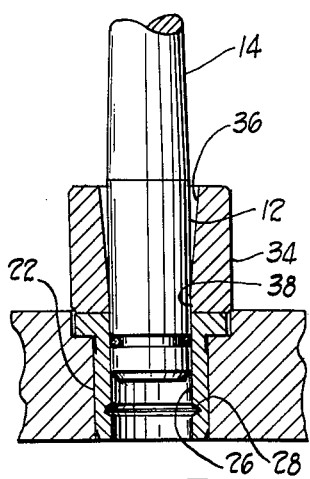
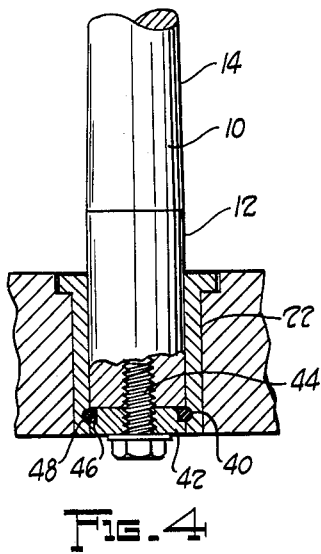
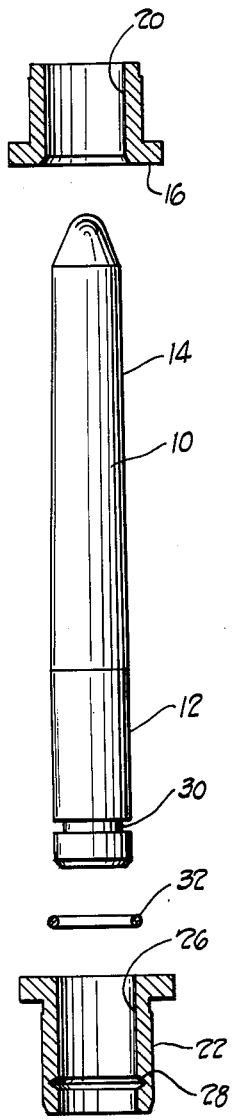
April 24, 1962 E. T. KINDT ET AL 3,030,677
GUIDE PIN
Filed Jan. 7, 1960
Fig. 1
Fig. 2
Fig. 3
Fig. 4
INVENTOR.
ERNEST T. KINDT
IRA A. RIMMEL
BY
ATTORNEY.

3,030,677
GUIDE PIN
Ernest T. Kindt and Ira A. Rimmel, Cleveland, Ohio, assignors to The Kindt-Collins Company, Cleveland, Ohio, a corporation of Ohio
Filed Jan. 7, 1960, Ser. No. 1,114
9 Claims. (Cl. 22—110)

This invention relates to guide pins for core boxes and more particularly to guide pins releasably mounted in the core box to eliminate damage to the core box due to misalinement in an automatic molding machine.

An object of this invention is to provide a core-box guide-pin assembly in which the guide pin is releasably mounted in operating position in such a way that in the event of undue force being applied to the pin it is released from the core box in order to prevent damage thereto.

In the use of mechanical molding machines, both automatic and manually controlled, portions of the core boxes or the cope and drag of molds are assembled by power operated equipment. Alinement of the parts of the core boxes during assembly is achieved by guide pins carried by one part which enter bushings mounted on a second part. If the guide pins do not register with the bushings with which engagement is to be made, the machine will apply the usual large closing force to the pin and pin bracket with the result that the pin assembly will be broken away and the core box damaged beyond repair. This problem is of particular significance in the production of blown cores wherein the equipment is capable of applying large forces to overcome the pressures in the core box.

Shear pins have been utilized for the purpose of releasing the pin when excess force is applied thereto due to malfunction of the machine; however, such a device has many disadvantages in that shear pins do not function uniformly, may be replaced with pins of the wrong material which cannot be sheared readily and requires costly maintenance and down time to get the machine back into operation. In reassembling such a pin mounting, the shear-pin parts must first be removed and a new pin installed from a stock which must be maintained at all times.

The push-out pin of this invention does not utilize parts requiring replacement and operates uniformly at a predetermined loading on the pin. The pin is held against removal by a ring which engages a groove in the pin and an opposing groove in the pin bracket. Force on the pin compresses the spring into the groove in the pin at which time the pin is free to move and is released from the pin holder. To replace the pin in operative position, a spring compressor is used which compresses the spring into the groove in the pin for insertion into the holder. When the pin groove has reached a location opposite to the groove in the pin holder, the ring expands into the holder groove and the pin is again operative. This replacement can be accomplished very quickly and there are no materials required to place the assembly in operative condition.

Accordingly, it is an object of this invention to provide a pin and bushing assembly having a reusable spring which operates to release the pin when a predetermined loading on the pin is exceeded.

A still further object of this invention is to provide a guide pin and bushing requiring a large force for disassembly and capable of reassembly by a small force through the use of a sleeve having a tapered inner bore for compressing the resilient locking means.

Another important object of the invention is to provide a guide pin and bushing assembly wherein confronting grooves retain a resilient ring, one of the grooves having a sloping wall for compressing the ring into the other groove when a large axial force is applied to the pin.

Another object of the invention is to provide a guide pin and bushing assembly having confronting grooves in the pin and bushing which retain a rubber-like ring which is sheared upon applying a predetermined axial force to the pin.

Other objects and advantages more or less ancillary to the foregoing, and the manner in which all the various objects are realized, will appear in the following description, which, considered in connection with the accompanying drawings, sets forth the preferred embodiment of the invention.

In the drawings:

FIG. 1 is an assembly view of the guide pin and bushing;

FIG. 2 is an exploded view showing the parts of the guide-pin assembly;

FIG. 3 is a detailed view showing the pin in partially assembled relation; and

FIG. 4 shows an alternate form of pin and resilient ring.

Referring to the drawings wherein the preferred embodiment of the invention is illustrated and particularly to FIG. 1 wherein is shown a guide pin 10 having a cylindrical section 12 and a tapered section 14. The angle of taper of the section 14 is approximately 1 degree which may be varied as dictated by the design of the equipment with which the pin is used. A bushing 16 is pressed into a core-box bracket 18 on either the cope or drag portion of the core box. The bushing 16 has a bore 20 of a size having sufficient clearance for a sliding fit with the cylindrical section 12 of the pin 10.

A pin-holding bushing 22 is press fit into a core-box bracket 24 and has a bore 26 formed therein for slidably receiving the cylindrical section 12 of the guide pin 10. Near one end of the bore 26, an annular groove is formed in the inner wall of the bushing 22 in a plane normal to the axis of the bore 26. Groove 28 is V-shaped having walls at an angle of 30 degrees to the plane of the groove which may be varied as required by the function of the apparatus as explained more fully hereafter.

A rectangular groove 30 is formed in the pin 10 opposite to the groove 28 when the pin is in assembled relation with the bushing 22. The groove 30 has the radial walls thereof parallel to the plane of the groove. A resilient ring 32 is carried by the groove 30 and is biased into engagement with the groove 28 as shown in FIG. 1. In the assembled position the ring 32 has portions in each of the grooves 28 and 30 and locks the pin 10 against axial movement relative to the bushing 22.

Upon the application of a large axial force to the pin 10, the tapered surfaces of the side walls of the groove 28 in the bushing 22 compress the ring 32 into the groove 30 in the pin 10, groove 30 having sufficient depth to provide a recess for the ring 32. When sufficient force has been applied to the pin 10 to compress the spring 32 until the outer diameter of the ring 32 is that of the section 12 of the pin 10, the pin 10 is no longer restrained by the ring 32 and is free to slide through the bushing 22 freely. The amount of force required to eject the pin 10 is controlled by the angle of the tapered surface of the groove 28 in the bushing 22 which may vary from a very slight angle to an angle of 45 degrees. An angle of 30 degrees gives an optimum holding power to the spring 32 when the cross-sectional diameter of the ring is 0.067 inch. By reducing the size of the ring the amount of force required for removal of the pin 10 is also reduced.

When the pin 10 has been ejected from the bushing 22, the ring 32 assumes a shape too large for entering into the bore 26. To facilitate the assembly of the pin 10 and the bushing 22, an assembly sleeve 34 is positioned over the bushing 22 in register with the bore 26. The sleeve 34 has a long tapered throat 36 and a short bore 38, the bore 38 corresponds in size to the bore 26. By inserting the pin 10, with the ring 32 in the groove 30, into the throat 36 of the bushing 34, nominal axial force on the pin 10 compresses the ring 32 into the groove 30 whereupon the pin 10 may be entered into the bushing 22 with ease. The pin 10 is pushed axially in the bushing 22 until the pin groove 30 has reached a position opposite the bushing groove 28 at which location the resilient ring 32 snaps into place and the pin 10 is restrained against further axial movement resulting from normal forces. Since the ring 32 does not hold the pin 10 against rotational movement, the pin 10 is free to shift about its axis, thus presenting new surfaces for contact by the bushing 16 which distributes the wear over its entire periphery.

An alternate form of guide-pin retainer is best illustrated in FIG. 4 wherein an annular groove 40 of semicircular shape is formed in the bushing 22. A retainer 42 having an outside diameter approximately that of the bore 26 is affixed to the end of the pin 10 by a bolt 44. The retainer 42 has arcuate shoulder 46 formed thereon confronting the end of the pin 10. Intermediate the shoulder 46 and the end of the pin 10, a ring 48 of rubber-like or plastic material is located with a portion of the ring 48 filling the groove 40. The pin 10 is held in operating position by the ring 48 until released as a result of a force exceeding a predetermined amount being applied to the pin 10 which results in the shearing of the ring 48 thus allowing the pin 10 to slide freely from the bushing 22. To reassemble the bushing 22 and the pin 10, the retainer 42 is detached by removing the bolt 44. A new ring 48 is positioned in the groove 40 and the pin 10 is inserted in the bore 22 until the end thereof engages the ring 40. The retainer 42 is then positioned against the end of the pin 10 with the shoulder 46 in contact with the ring 48 and the bolt is assembled to the pin 10 to hold the retainer 42 snugly thereagainst.

Having thus described this invention in such full, clear, concise, and exact terms as to enable any person skilled in the art to which it pertains to make and use the same, and having set forth the best mode contemplated of carrying out this invention, we state that the subject which we regard as being our invention is particularly pointed out and distinctly claimed in what is claimed, it being understood that equivalents or modifications of, or substitutions for, parts of the above specifically described embodiments of the inventtion may be made without departing from the scope of the invention as set forth in what is claimed.

What is claimed is:

1. Apparatus for alining the cope and drag of a core box comprising a bushing adapted to be mounted in one of said core-box parts, a second bushing having a cylindrical bore and adapted to be mounted in the other of said core-box parts, a groove formed in the inner wall of said second bushing, a pin releasably carried by said second bushing and having a portion in sliding fit with the first and second bushings, an annular groove formed in said portion of the pin, and a resilient ring in engagement with said pin groove and said bushing groove for releasably restraining said pin against axial movement in respect to said second bushing, said pin groove receiving said ring when said ring is compressed upon axial movement of said pin.

2. Apparatus for alining the cope and drag of a core box comprising a bushing and adapted to be mounted in one of said core-box parts, a second bushing having a cylindrical bore and adapted to be mounted in the other of said core-box parts, a V-shaped annular groove formed in the inner wall of said second bushing, a pin releasably carried by said second bushing and having a portion in sliding fit with said first and second bushings, an annular groove formed in said portion of the pin, and a resilient ring in engagement with said pin groove and said bushing groove for releasably restraining said pin against axial movement in respect to said second bushing, said pin groove receiving said ring when said ring is compressed upon axial movement of said pin.

3. Apparatus for alining the cope and drag of a core box comprising a bushing having a cylindrical bore and adapted to be mounted in one of said core-box parts, a second bushing having a cylindrical bore and adapted to be mounted in the other of said core-box parts, a V-shaped annular groove formed in the inner wall of said second bushing, a pin releasably carried by said second bushing and having a portion in sliding fit with said bores in the first and second bushings, an annular groove formed in said portion of the pin, and a resilient ring in engagement with said pin groove and said bushing groove for releasable restraining said pin against axial movement in respect to said second bushing, said pin groove receiving said ring when said ring is compressed upon axial movement of said pin.

4. Apparatus for alining the cope and drag of a core box comprising a bushing adapted to be mounted in one of said core-box parts, a second bushing having a cylindrical bore and adapted to be mounted in the other of said core-box parts, an annular groove in the inner wall of said second bushing, said groove having a surface at a taper in respect to the axis of said bushing, a pin releasably carried by said second bushing and having a portion in sliding fit with the first and second bushings, an annular recess formed in said portion of the pin, and a resilient ring in engagement with said bushing groove and said recess, said recess receiving said ring when said ring is compressed by the tapered surface upon longitudinal movement of the pin.

5. Apparatus for alining the cope and drag of a core box comprising a bushing adapted to be mounted in one of said core-box parts, a second bushing having a cylindrical bore and adapted to be mounted in the other of said core-box parts, an annular groove in the inner wall of said second bushing, said groove having a surface at a taper in respect to the axis of said bushing, a pin releasably carried by said second bushing and having a portion in sliding fit with the first and second bushings, an annular recess formed in said portion of the pin opposite said groove in the bushing when the pin is in assembled location, and a resilient ring in biased engagement with said bushing groove and having a portion in said recess, said recess receiving said ring when said ring is compressed by the tapered surface upon longitudinal movement of the pin.

6. Apparatus for alining the cope and drag of a core box comprising a bushing adapted to be mounted in one of said core-box parts, a second bushing having a cylindrical bore and adapted to be mounted in the other of said core-box parts, an annular groove in the inner wall of said second bushing, said groove having a surface at a taper in respect to the axis of said bushing, a pin releasably carried by said second bushing and having a portion in sliding fit with the first and second bushings, an annular recess having parallel walls formed in said portion of the pin opposite said groove in the bushing when the pin is in assembled location, and a spring-like ring in biased engagement with said bushing groove and having a portion in said recess, said recess receiving said ring when said ring is compressed by the tapered surface upon longitudinal movement of the pin.

7. Apparatus for alining the cope and drag of a core box comprising a bushing adapted to be mounted in one of said core-box parts, a second bushing having a cylindrical bore and adapted to be mounted in the other of said core-box parts, an annular groove in the inner wall of said second bushing, a pin releasably carried by said second bushing and in sliding fit with the first and second bushings, and a rubber-like ring in engagement with said bushing groove and the end of said pin, a retainer affixed to the end of said pin, and a shoulder on said retainer spaced from and confronting the end of said pin, said ring being in the annular space intermediate the shoulder, the end of the pin and said bushing groove.

8. Apparatus for alining the cope and drag of a core box comprising a bushing adapted to be mounted in one of said core-box parts, a second bushing having a cylindrical bore and adapted to be mounted in the other of said core-box parts, an annular groove in the inner wall of said second bushing having an arcuate wall, a pin releasably carried by said second bushing and in sliding fit with the first and second bushings, and a resilient ring in engagement with said bushing groove and the end of said pin, a retainer removably affixed to the end of said pin, and an arcuate shoulder on said retainer spaced from and confronting the end of said pin, said ring being in the annular space intermediate the shoulder, the end of the pin and said bushing groove.

9. Apparatus for alining the cope and drag of a core box comprising a bushing adapted to be mounted in one of said core-box parts, a second bushing having a cylindrical bore and adapted to be mounted in the other of said core-box parts, an annular groove in the inner wall of said second bushing having an arcuate wall, a pin releasably carried by said second bushing and in sliding fit with the first and second bushings, and a rubber-like ring in engagement with said bushing groove and the end of said pin, a retainer removably affixed to the end of said pin, a shoulder on said retainer spaced from and confronting the end of said pin, said ring being in the annular space intermediate the shoulder, the end of the pin and said bushing groove, and bolt means threadably engaged with the pin and holding said retainer in operative relation therewith.

References Cited in the file of this patent

UNITED STATES PATENTS

| | | |
|---|---|---|
| 1,743,492 | Sipe | Jan. 14, 1930 |
| 2,357,139 | Seme | Aug. 29, 1944 |
| 2,760,258 | Rieger | Aug. 28, 1956 |

FOREIGN PATENTS

| | | |
|---|---|---|
| 378,309 | Germany | July 10, 1923 |
| 1,018,000 | France | Oct. 8, 1952 |